United States Patent
Campbell

(10) Patent No.: US 10,164,860 B2
(45) Date of Patent: Dec. 25, 2018

(54) MODIFIED CONTENT DELIVERY BASED ON NETWORK CONDITIONS

(71) Applicant: Comcast Cable Communications, LLC., Philadelphia, PA (US)

(72) Inventor: Joseph Campbell, Cherry Hill, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 536 days.

(21) Appl. No.: 14/247,832

(22) Filed: Apr. 8, 2014

(65) Prior Publication Data

US 2015/0288593 A1 Oct. 8, 2015

(51) Int. Cl.
| | |
|---|---|
| H04L 12/26 | (2006.01) |
| H04L 12/24 | (2006.01) |
| G06F 17/30 | (2006.01) |
| H04L 29/06 | (2006.01) |

(52) U.S. Cl.
CPC ........ *H04L 43/16* (2013.01); *G06F 17/30899* (2013.01); *H04L 41/147* (2013.01); *H04L 65/4084* (2013.01); *H04L 65/602* (2013.01); *H04L 65/80* (2013.01)

(58) Field of Classification Search
CPC ..... H04L 43/16; H04L 41/147; H04L 65/602; H04L 65/4084; H04L 65/80; G06F 17/30899
See application file for complete search history.

(56) References Cited

U.S. PATENT DOCUMENTS

| | | | | |
|---|---|---|---|---|
| 7,853,676 B1* | 12/2010 | Freskos | ............... | H04L 41/0266 709/201 |
| 8,380,593 B1* | 2/2013 | Patro | ................... | H04L 43/08 379/114.03 |
| 2005/0071745 A1* | 3/2005 | Ehrich | ................... | H04L 67/02 715/200 |
| 2006/0077897 A1* | 4/2006 | Kotzin | ................... | H04L 67/06 370/235 |
| 2008/0101312 A1* | 5/2008 | Suzuki | ................ | H04L 1/0007 370/342 |
| 2008/0229364 A1* | 9/2008 | Ryu | .................... | H04N 5/44543 725/54 |
| 2012/0005365 A1 | 1/2012 | Ma et al. | | |
| 2012/0060180 A1* | 3/2012 | Johansson | ......... | H04N 21/2541 725/27 |
| 2012/0215839 A1* | 8/2012 | Doyle | .................... | H04L 67/06 709/203 |
| 2012/0246279 A1 | 9/2012 | Zang et al. | | |

(Continued)

OTHER PUBLICATIONS

Extended European Search Report—EP 15162822.9—dated Aug. 25, 2015.

(Continued)

*Primary Examiner* — Abdulkader M Alriyashi
(74) *Attorney, Agent, or Firm* — Banner & Witcoff, Ltd.

(57) ABSTRACT

Systems and methods for sending data and pointers to data in response to a request for data are described. The system may receive a request for data from a device, and based on network conditions, such as network load, latency, available bandwidth, congestion, etc., the system may return a portion of the requested data and one or more pointers to a second portion of the requested data to the requesting device. A device may request the second portion of the data by selecting one or more of the pointers.

20 Claims, 5 Drawing Sheets

(56) References Cited

U.S. PATENT DOCUMENTS

| | | | | |
|---|---|---|---|---|
| 2013/0007869 A1* | 1/2013 | Thomas | ............... | G06F 21/335 726/9 |
| 2014/0047059 A1* | 2/2014 | Brownlow | .......... | H04L 67/1074 709/213 |
| 2014/0236742 A1* | 8/2014 | Sakuma | ............. | G06Q 30/0241 705/14.73 |
| 2015/0032696 A1* | 1/2015 | Camble | ............... | G06F 11/1456 707/634 |

OTHER PUBLICATIONS

Ulm et al., "Advanced Quality of Experience Monitoring Techniques for a New Generation of Traffic Types Carried by DOCSIS Smart ABR: The Future of Managed IP Video Services Contents", Sep. 16, 2013, pp. 1-38.

Cisco Systems: "Models for HTTP-Adaptive-Streaming-Aware Content Distribution Network Interconnection (CDNI)": Geneva, Switzerland, Jul. 24, 2013.

EP Office Action—EP App. 15162822.9—dated Apr. 20, 2017.

\* cited by examiner

MODIFIED CONTENT DELIVERY BASED ON NETWORK CONDITIONS

BACKGROUND

A device requesting data can modify its requests based on the current network traffic. For example, if a device detects heavy network traffic, the device can modify its request for less data than the device would otherwise request. A problem with this approach is that each device must be able to monitor current network traffic and modify its own data requests accordingly. A server device may also respond to a request for data with an error code, such as a Hypertext Transfer Protocol (HTTP) 503 error code, rather than delivering the requested data to the device. A problem with this approach is that the device is prevented from learning the reason the requested data cannot be delivered and the server is prevented from delivering even a subset of the requested data. These and other problems are addressed by the present disclosure.

SUMMARY

Some of the various features described herein relate to a system and method for receiving a request for data from a device and transmitting data to the requesting device. Based on network conditions, the system may identify a first portion of the requested data to send to the device. Furthermore, the system may generate an identifier, such as a pointer, for a second portion of the requested data. The first portion of the requested data and the generated pointer may be sent to the device. The system may also determine that an amount of the requested data exceeds a threshold, and the identifying the first portion of the requested data may be performed in response to determining that the amount of the requested data exceeds the threshold.

In some aspects, an identifier (e.g., a pointer) may comprise a plurality of pointers, such as a first pointer and a second pointer. The first pointer and the second pointer may further be associated to the device (e.g., made unique to the device). Additionally or alternatively, the first pointer and the second pointer may be associated to an identifier that identifies the request for data. Additionally or alternatively, the first pointer may be associated to the second pointer.

In some aspects, a second request for data may be received. The second request may identify the first request for data and/or the first pointer. For example, in response to determining that the second request identifies the first pointer, the system may determine first data associated with the first pointer and second data associated with a second pointer. The system may send the first data associated with the first pointer and the second data associated with the second pointer to the device. In another example, in response to determining that the second request includes the identifier that identifies the first request for data, the system may determine first data associated with the first pointer and second data associated with the second pointer. Based on a network load, the system may send the first data associated with the first pointer, a first portion of the second data associated with the second pointer, and a third pointer associated with a second portion of the second data in response to determining that the network load exceeds a threshold. Alternatively, the system may send the first data associated with the first pointer and the second data associated with the second pointer in response to determining that the network load does not exceed a threshold.

In some aspects, a non-transitory computer-readable medium storing computer-readable instructions that, when read by a computing device, may cause the computing device to receive a request for data from a device. Based on network conditions, the computing device may identify a first portion of the requested data to send to the device and/or generate a pointer for a second portion of the requested data to send to the device. The first portion of the requested data and the generated pointer may be sent to the device. The computing device may also determine a future time window to send the first portion of the requested data and the generated pointer based on a prediction of future network conditions. The sending the first portion of the requested data and the generated pointer to the device may be performed during the future time window. The computing device may also store the second portion of the requested data at a location identified by the generated pointer.

In some aspects, a method may include receiving a request for data from a client device via a communication network. A current load of the communication network may be determined. In response to determining that the current load of the communication network exceeds a threshold, a computing device may identify a portion of the requested data to send to the client device and generate a plurality of links for a remainder of the requested data to send to the client device. The portion of the requested data and the plurality of links may be sent to the client device. In some aspects, a second request may be received from the client device, wherein the second request may identify at least one of the plurality of links. In response to determining that the second request identifies the at least one of the plurality of links, the remainder of the requested data may be sent to the client device.

In some aspects, the identifier, e.g., a pointer, may comprise a uniform resource identifier (URI) or a hypertext transfer protocol (HTTP) link. In some aspects, the network conditions may comprise one or more of a load of a server responding to the request, a load of the device, and a load of a communication link connecting the device to the server. The network conditions may also comprise one or more of a throughput, available bandwidth, latency between the device and a server, and network congestion.

Requested data may comprise content or program guide data for a length of time, such that the first portion of the requested data comprises content or program guide data for a portion of the length of time and the second portion of the requested data comprises content or program guide data for a remainder of the length of time. Additionally or alternatively, requested data may comprise a plurality of files. The first portion of the requested data may comprise a subset of the plurality of files, and the second portion of the requested data may comprise a remainder of the plurality of files.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
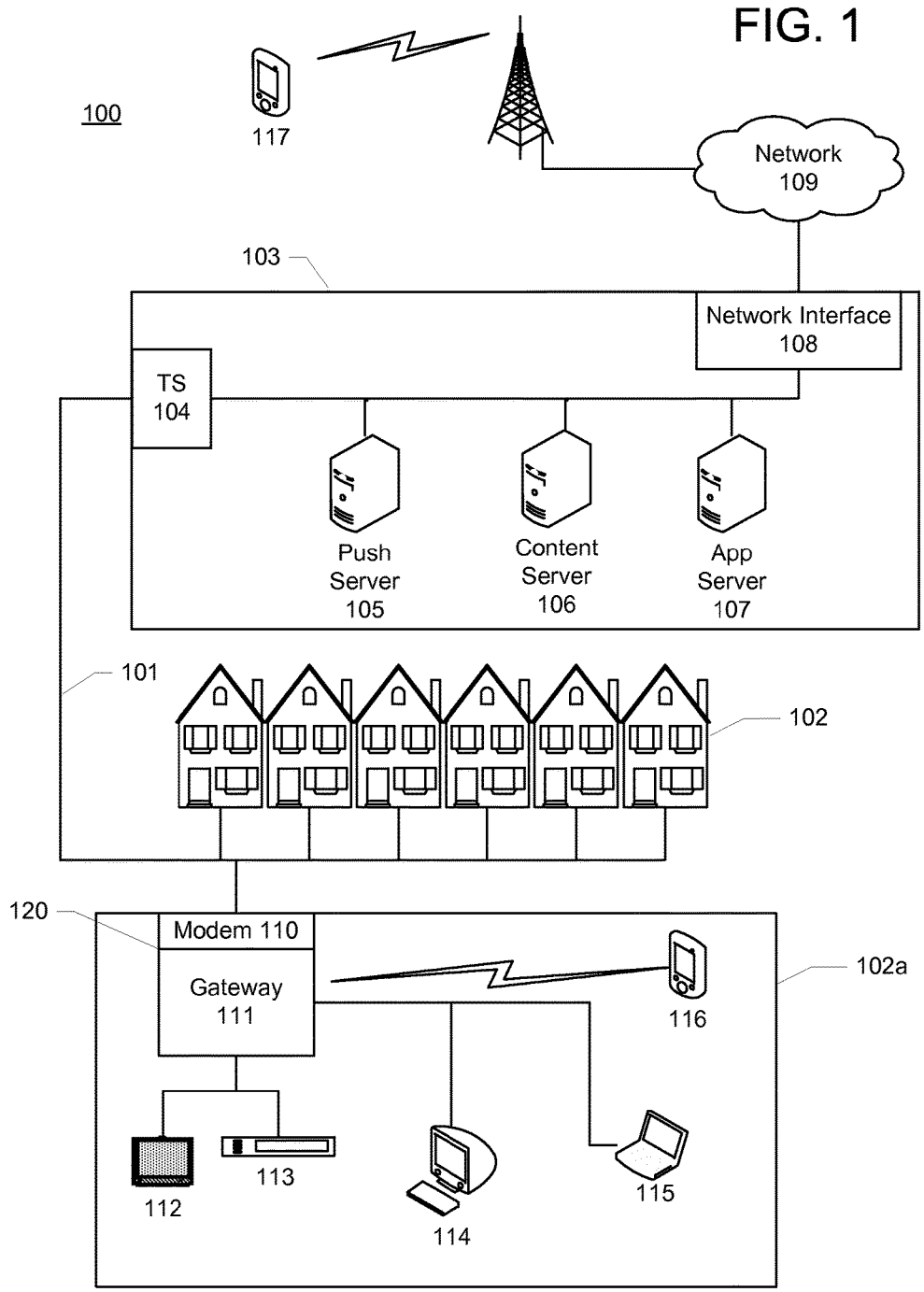
FIG. 1 illustrates an example data access and distribution network.

FIG. 1 illustrates an example data access and distribution network 100 on which many of the various features described herein may be implemented. Network 100 may be any type of data distribution network, such as satellite, telephone, cellular, wireless, etc. One example may be an optical fiber network, a coaxial cable network or a hybrid fiber/coax (HFC) distribution network. Such networks 100 use a series of interconnected communication links 101 (e.g., coaxial cables, optical fibers, wireless connections, etc.) to connect multiple premises, such as homes 102, to a local office (e.g., a central office or headend 103). The local office 103 may transmit downstream data signals onto the links 101, and each home 102 may have a receiver used to receive and process those signals.

There may be one link 101 originating from the local office 103, and it may be split a number of times to distribute the signal to various homes 102 in the vicinity (which may be many miles) of the local office 103. Although the term home is used by way of example, locations 102 may be any type of user premises, such as businesses, institutions, etc. The links 101 may include components not illustrated, such as splitters, filters, amplifiers, etc. to help convey the signal clearly. Portions of the links 101 may also be implemented with fiber-optic cable, while other portions may be implemented with coaxial cable, other links, or wireless communication paths.

The local office 103 may include an interface 104, which may be a termination system (TS), such as a cable modem termination system (CMTS), which may be a computing device configured to manage communications between devices on the network of links 101 and backend devices such as servers 105-107 (to be discussed further below). The interface may be as specified in a standard, such as, in an example of an HFC-type network, the Data Over Cable Service Interface Specification (DOCSIS) standard, published by Cable Television Laboratories, Inc. (a.k.a. Cable-Labs), or it may be a similar or modified device instead. The interface may be configured to place data on one or more downstream channels or frequencies to be received by devices, such as modems at the various homes 102, and to receive upstream communications from those modems on one or more upstream frequencies. The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various homes 102 in the network (or more specifically, to the devices in the homes 102 that are configured to detect such notifications). The local office 103 may also include a data server 106. The data server 106 may be one or more computing devices that are configured to provide data to users in the homes. This data may be, for example, video on demand movies, television programs, songs, text listings, etc. The data server 106 may include software to validate user identities and entitlements, locate and retrieve requested data, encrypt the data, and initiate delivery (e.g., streaming) of the data to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102.

An example home 102a may include an interface 120. The interface may comprise a device 110, such as a modem, which may include transmitters and receivers used to communicate on the links 101 and with the local office 103. The device 110 may be, for example, a coaxial cable modem (for coaxial cable links 101), a fiber interface node (for fiber optic links 101), or any other desired modem device. The device 110 may be connected to, or be a part of, a gateway interface device 111. The gateway interface device 111 may be a computing device that communicates with the device 110 to allow one or more other devices in the home to communicate with the local office 103 and other devices beyond the local office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, Bluetooth, zigbee, cellular, and others).

Figure 2:
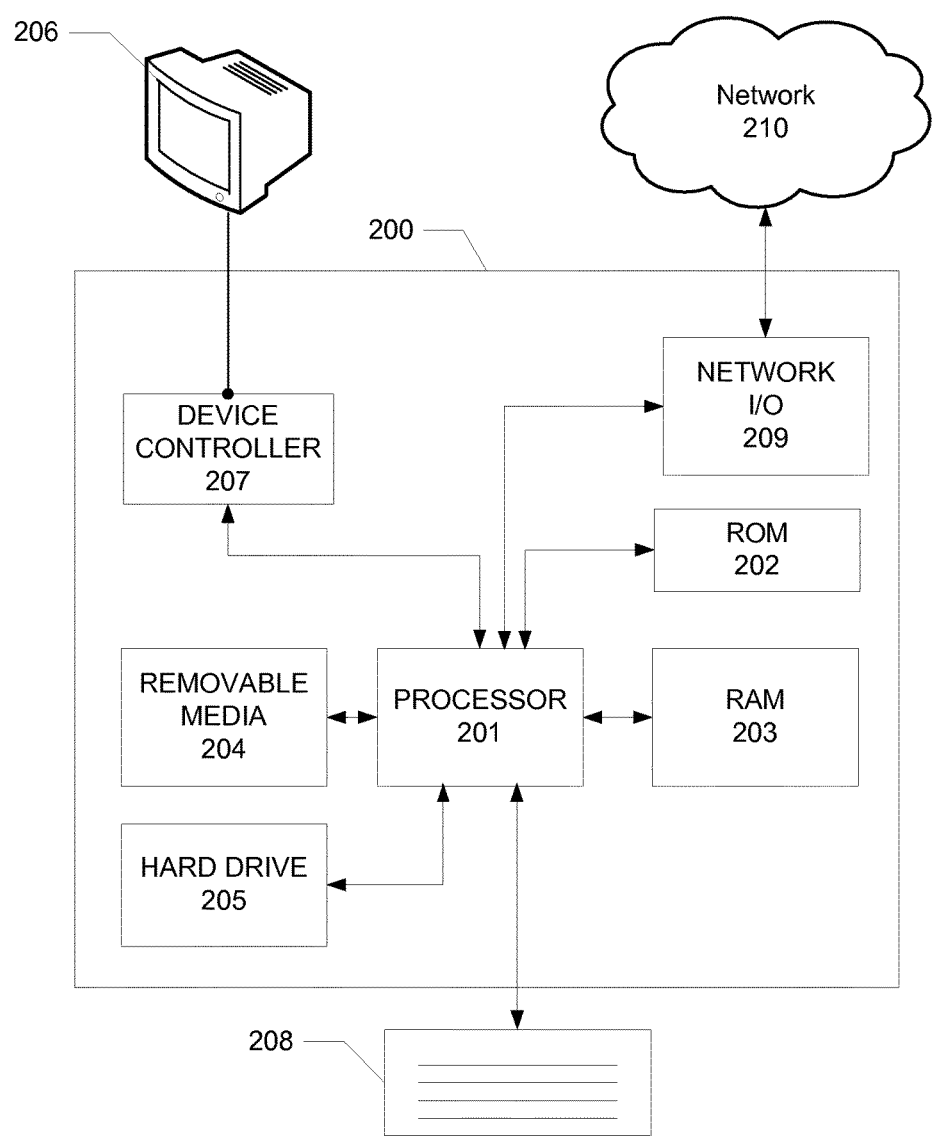
FIG. 2 illustrates an example hardware and software platform on which the various elements described herein can be implemented.

FIG. 2 illustrates general hardware and software elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication links 101 discussed above, the external network 109, an in-home network, a provider's wireless, coaxial, fiber, or hybrid fiber/coaxial distribution system (e.g., a DOCSIS network), or any other desired network.

Figure 3:
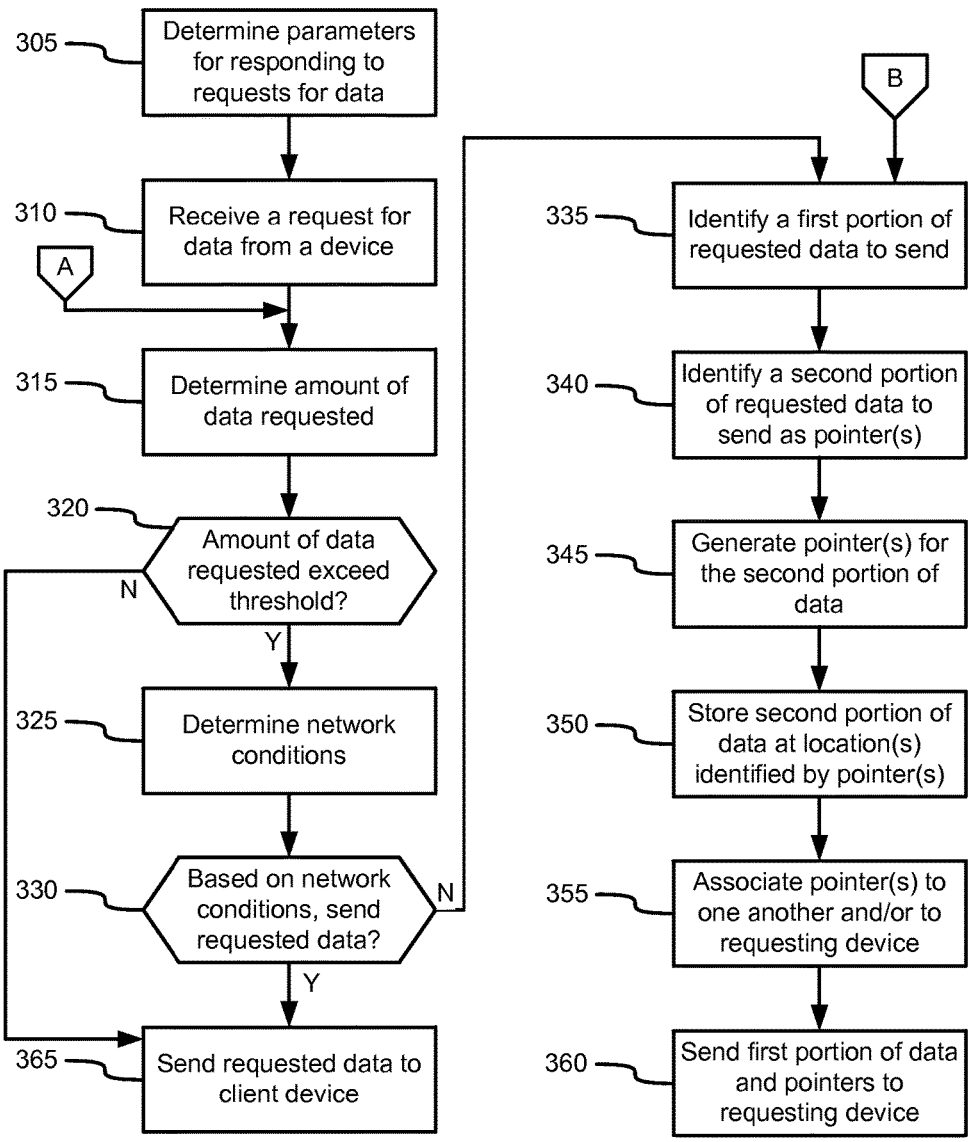
FIG. 3 illustrates an example method of responding to a request for data according to one or more illustrative aspects of the disclosure.

FIG. 3 illustrates an example method of responding to a request for data according to one or more illustrative aspects of the disclosure. The method may be performed by any computing device, such as the push server 105, content server 106, application server 107, a combination thereof, or any other server or device capable of providing data to requesting devices. The computing device, as discussed herein, may refer to a single device or a group of devices operating as a system in a network. The computing device may respond to requests for data sent by one or more requesting devices, such as the gateway 111, television 112, STB 113, personal computer 114, laptop computer 115, wireless device 116, or any other device or client device capable of requesting data. As will be described in further detail below, the computing device may respond to the request based on current network conditions. These conditions may include the load of one or more requesting devices, one or more servers used to respond to those requests, one or more communication links, the network as a whole, and/or a combination thereof. Network conditions may also include, for example, the throughput of one or more general or specific communication links (e.g., links connecting servers to requesting devices), available bandwidth of a communication link connecting the server to the requesting device or of the entire network, latency of data sent between the requesting device and the server, network congestion, error conditions, such as packet loss and/or the number of retransmissions required, etc. Network conditions may also include historical interactions between the requesting device and the server, including prior latency of data sent between the two devices, historical bandwidth availability, and the like.

Network conditions may be measured based on the quality of service (QoS) of the data delivery network. Aggregate network conditions may be determined by factoring in several network conditions. Weights may be applied to each network condition to prioritize some network conditions over others, as will be described in further detail below. For example, the system may assign a weight of 4 to server load, a weight of 3 to the bandwidth of a communication link connecting the server to a requesting device, and a weight of 1 to data latency. Accordingly, more weight will be given to server load than to the bandwidth of the communication link, and more weight will be given to both server load and bandwidth than to data latency.

In step 305, the computing device may determine parameters for responding to requests for data. The parameters may be agreed upon by the computing device and one or more requesting devices, such as during a negotiation process between the computing device and the requesting device. Parameters may comprise one or more thresholds for the network conditions, which may be set by a network operator according to specific business rules, etc. One threshold may relate to the amount of data requested by the requesting device. For example, the threshold may be 10 MB, which may be determined by the computing device, the requesting device, or during the negotiation process. As will be described in further detail below, the computing device may send all of the data requested by the requesting device if the amount of data requested does not exceed the threshold. On the other hand, the computing device may send some of the requested data and identifiers, e.g., locations, pointers, links, to the remainder of the requested data if the amount of data requested exceeds the threshold. By sending the pointers, the computing device may reduce the amount of data being transmitted to the requesting device when the network is heavily loaded or may enable transmission via a different network link depending upon the pointer. The threshold may also be adjusted based on current network conditions. For example, if the computing device or requesting device determines that the network is currently overloaded, the threshold may be decreased, such as to 5 MB. By decreasing the threshold, a lesser amount of data may be sent to the requesting devices.

Another threshold may relate to the network conditions. For example, if the network condition is throughput, the computing device, requesting device, or a combination of the two (e.g., during the negotiation process) may determine that the threshold network condition is 200 Mb/s. As will be described in further detail below, the computing device may send all of the data requested by the requesting device if the current throughput exceeds 200 Mb/s. On the other hand, the computing device may send some of the requested data and pointers (e.g., links) to the remainder of the requested data if the current throughput does not exceed 200 Mb/s. By sending the pointers, the computing device may reduce the amount of data being transmitted to the requesting device when the network is heavily loaded.

An additional threshold may relate to the amount of time needed to transmit data, which may be a function of the available bandwidth, the current load, and/or the size of the transmitted data. For example, a threshold amount of time may be 100 ms. If the amount of time to transmit all of the requested data to the requesting device does not exceed 100 ms, the computing device may send all of the data requested by the requesting device. On the other hand, if the amount of time to transmit all the requested data exceeds 100 ms, the computing device may send some of the requested data and pointers to the remainder of the requested data. For example, the computing device may identify a subset of the requested data that can be sent to the requesting device in 100 ms or less and send the subset to the requesting device. Links to the remainder may also be sent to the requesting device. Any of the thresholds discussed herein may be adjusted (i.e., increased or decreased) based on current network conditions, as previously discussed.

The computing device may also determine how much weight to give each network condition. The computing device may consider, for example, computing device load, requesting device load, and load of the communication link(s) connecting the requesting device to the computing device. Each of these network conditions may be assigned a weight, such as 3 for computing device load, 1 for requesting device load, and 5 for communication link load. In this example, the communication link load is prioritized over the computing device load, and the computing device load is prioritized over requesting device load. Aggregate network conditions may be calculated based on each of these three network conditions along with their respective weights.

In step 310, the computing device may receive a request for data from a requesting device. Examples of data that the requesting device may request include files, documents, content, such as videos, images, webpages, program guide data (e.g., listings for past, present, and/or future programs), or any other type of data. For user interfaces such as program guide data, the requesting device may request program guide data for a length of time, such as listings for programs expected to be available or transmitted today and the following three days. In some instances, the program guide data requested may include a large amount of data if, for example, the requesting device requests program guide data for an entire year. The returned program listings may include, for example, a description of each program, the time that each program will broadcast, a photo and/or video previewing each program, and/or other information describing each program.

In another example, the requesting device may request a webpage, which may include images, videos, text, hyperlinks, etc. In yet another example, the requesting device may request a data stream, or numerous data files, such as thousands of photos. While examples of content, program guide data, webpages, and files have been listed above, a person having ordinary skill in the art would understand that the requesting device may request any type of data from any number of computing devices. As will be described in the examples that follow, the computing device may respond to requests differently based on different network conditions.

In step 315, the computing device may determine the amount of data requested. The computing device may estimate the amount of data that will be returned based on the request before identifying and sending a request to one or more databases storing the requested data. The computing device may perform a data fetch to determine the amount of data requested or alternatively estimate the amount of data requested without performing a data fetch. In the program guide example, today's program guide data may comprise 10 MB of data, tomorrow's program guide data may comprise 12 MB of data, the third day's program guide data may comprise 7.5 MB of data, and the fourth day's program guide data may comprise 10 MB of data. The computing device may determine that the requesting device has requested a total of 39.5 MB of data. Similarly, if the device (e.g., a client) requested a webpage or a movie, the computing device may determine the total amount of data that would be returned to the requesting device, including image data, video data, text data, etc. to be displayed on the webpage.

In step 320, the computing device may determine whether the amount of data exceeds a threshold. As previously discussed, the threshold may have been determined in step 305. Alternatively, the computing device may determine the threshold dynamically and/or based on current network conditions. A baseline threshold may be assigned to normal network conditions, which may be based on throughput, available bandwidth, latency, etc. The actual threshold used by the computing device in step 320 may be increased or decreased from the baseline threshold based on current network conditions. For example, the baseline threshold may be decreased if the network is currently overloaded, such as if the current latency (or other network condition described herein) exceeds a baseline latency by a predetermined amount. Similarly, the baseline threshold may be increased if the network is currently underloaded, such as if the current latency is less than the baseline latency by a predetermined amount.

Assume, for example, the threshold is set to 10 MB. If the amount of data requested does not exceed 10 MB, the computing device may send all of the requested data to the requesting device in step 365. On the other hand, if the amount of data requested exceeds 10 MB, the computing device may divide the requested data into two or more groups and send one group as data, such as inline data, and the remaining group(s) as links to data, as will be described in detail below.

In step 325, the computing device may determine the current network conditions, such as computing device load, available bandwidth, latency, throughput, etc. If the computing device considers more than one network condition, the computing device may prioritize one network condition over other network conditions using weights as previously described. Each weight may have been determined in step 305. For example, a user may provide the computing device with appropriate weights for prioritizing network conditions. Network conditions may be determined in real-time, such as each time the requesting device requests data. Network conditions may additionally or alternatively be determined occasionally or periodically. For example, the computing device may determine network conditions every five minutes and store the information in a database. When the computing device receives a request for data, the computing device may retrieve the most recently stored network conditions.

In step 330, the computing device may determine whether to send all of the data requested by the requesting device based on the network conditions. For example, assume the network condition monitored is throughput. If the current throughput (determined in step 325) exceeds a threshold throughput, the computing device may determine that the current network conditions are favorable and send all of the requested data in step 365. On the other hand, if the current throughput does not exceed the threshold throughput, the computing device may proceed to step 335. As another example, assume the network condition monitored is the amount of time needed to send all of the data to the requesting device. If the amount of time does not exceed a threshold amount of time (e.g., 100 ms), the computing device may determine that the current network conditions are favorable and send all of the requested data in step 365. On the other hand, if the amount of time exceeds the threshold amount of time, the computing device may proceed to step 335. As previously described, the computing device may consider more than one network condition and weigh each condition accordingly to determine aggregate network conditions.

In step 335, the computing device may identify a first portion of the requested data to send to the requesting device. The first portion of the requested data may comprise data included directly in the response to the request (e.g., inline data). The first portion of the data may be streamed, transferred by file, or otherwise transmitted to the requesting device. In step 340, the computing device may identify a second portion of the requested data for which identifiers or pointers (e.g., links) may be sent pointing to the location of the second portion of data. Pointers to the second portion of the requested data may comprise links that point to locations storing the second portion of requested data. The second portions of data can be, at a certain time, transferred to the location, or may already reside there. In some aspects, the second portion may comprise the remainder of the requested data not identified as the first portion. In some instances, all of the requested data may be sent as pointers, such as if the network is overloaded. Several non-limiting examples of steps 335 and 340 will now be described.

In one example, the requesting device may have requested program guide data for today and the following three days. In step 335, the computing device may determine that the first portion comprises today's program guide data, and in step 340, the computing device may determine that the second portion comprises the remainder (e.g., the remaining three days of program guide data). A person having ordinary skill in the art would recognize that the first and second portions may be divided based on any length of time. For example, the first portion may comprise today's and tomorrow's program listings, and the second portion may comprise listings for the third and fourth days. Alternatively, the first portion may comprise today's listings and listing's for tomorrow until 2:00 PM, and the second portion may comprise the remainder.

In addition to or as an alternative to dividing the program guide data based on time, the computing device may divide the data based on data type. Example data types include text data, image data, and video data. For example, in step 335, the computing device may identify the text data and the image data for all four days as the first portion and, in step 340, identify the video data for all four days as the second portion to send as pointers. The computing device may use a combination of time and type to separate the requested data into first and second portions. For example, text data and image data for today and tomorrow may be identified as the first portion, and the remainder may be identified as the second portion.

In another example, the requesting device may have requested video content or a webpage comprising images, videos, text, and other information. The computing device may divide the webpage data based on data type or divide a movie into portions of various sizes. For example, in step 335, the computing device may identify the webpage text as the first portion. In step 340, the computing device may identify the videos and images as the second portion of data to be sent as pointers to those images and videos.

In yet another example, the requesting device may have requested a plurality of files, such as photos. The first portion of the data may comprise a subset of the plurality of photos. The second portion of the requested data may comprise the remainder of the plurality of photos to be sent as pointers. For example, if the requesting device has requested 10,000 photos the first portion may comprise the first 10 photos and links to the remaining photos 9,990 may be generated and provided to the requesting device.

Identifying the first and second portions of data in steps 335 and 340 may also be based on one or more thresholds. For example, the computing device may use the threshold amount of data (e.g., 10 MB) determined in step 305. The computing device may identify the first 10 MB of data requested by the requesting device as the first portion and identify the remainder as the second portion. The threshold may also be used in combination with the time factor discussed above. For example, in step 335, the computing device may identify the first 10 MB of program guide data (starting from the current time) as the first portion. The first 10 MB may include all of the program guide data for today along with one-third of the program guide data for tomorrow. In step 340, the computing device may identify the remainder of the program guide data as the second portion (e.g., two-thirds of tomorrow's program guide data and the program guide data for the third and fourth days).

The threshold may also be used in combination with the data types discussed above. For example, in step 335, the computing device may identify the first 10 MB of text and image data as the first portion and, in step 340, identify the remaining text and/or image data and all of the video data as the second portion. If the text and image data comprise less than 10 MB of data, the computing device may include one or more of the video data in the first portion and the remainder of the video data in the second portion.

In step 345, the computing device may generate one or more pointers for the second portion of data. Pointers may point to the second portion of data (or a location that the second portion of data can be found or is stored). For example, a pointer may comprise a uniform resource identifier (URI), such as a uniform resource name (URN) and/or a uniform resource locator (URL). The pointer may comprise a link, such as a hypertext transfer protocol (HTTP) link to the requested data. For example, if the second portion of data comprises the program guide data for the third and fourth days, the computing device may generate a first HTTP link as "http://api/program_data/day3/" and a second HTTP link pointer as "http://api/program_data/day4/."

In some aspects, the computing device may generate a single identifier or pointer for all of the data identified as the second portion. Alternatively, the computing device may generate several pointers, such as a first pointer and a second pointer, for each logically separate piece of data. For example, a first pointer may be generated for a first video on the webpage and a second pointer may be generated for a second video on the webpage. As another example, a first pointer may be generated for program guide data for the third day and a second pointer may be generated for program guide data for the fourth day. As yet another example, a first pointer may be generated for a first portion of a movie and a second pointer may be generated for a second portion of the movie.

In step 350, the computing device may optionally store the second portion of data at a location (or locations) identified by the generated pointer (or pointers). These locations may be within the computing device itself or at other locations in the network. If the data already exists at one or more locations, the computing device might not need to perform step 350. For example, the pointers may be generated based upon a known, identified location where the second portion of data is already stored. Furthermore, steps 345 and 350 may be performed in reverse order. For example, the computing device may store the second portion of data at particular storage location(s). Subsequently, the computing device may generate one or more pointers identifying those storage locations.

In step 355, the computing device may associate the pointers to one another, to a common identifier, and/or to the requesting device. For example, if two pointers were generated, the computing device may associate the first pointer and the second pointer to the requesting device (or an identifier of the requesting device, such as a MAC address, device name, etc.). When the first and second pointers are associated to the requesting device, the pointers may be unique to the requesting device, such as by including the device name or other identifier of the requesting device in the pointer structure. For example, if the pointer is a URL associated with a device named "Device 123," the URL might be "http://link_to_data/Device_123" or any other URL that otherwise identifies Device 123. Additionally or alternatively, the computing device may associate the first pointer and the second pointer to an identifier that identifies the specific request for data. Additionally or alternatively, the computing device may associate the first pointer to the second pointer.

In step 360, the computing device may send the first portion of the requested data and the generated pointer(s) for the second portion of the requested data to the requesting device. For example, the computing device may send today's program guide listings and all text, images, and videos included therein to the requesting device. The computing device may send the remaining program guide listings (e.g., tomorrow's, the third day's, and the fourth day's) as one or more pointers (e.g., a URI, such as an HTTP link). The links may be sent in an HTML or XHTML format, such as in the form of a webpage or any other format.

In some aspects, the requesting device might not be able to determine whether it received the requested data or pointers to the requested data. Accordingly, the computing device might also include, in its response, data, e.g., as metadata, that identifies whether the data that it returned is inline data or links to data. The response may also include metadata describing the links data. For example, if the second portion of requested data comprises images, the returned metadata may identify the title and date or even comprise a thumbnail of each of the images. The computing device and client may negotiate how this metadata is formatted and included in the response, such as in step 305.

In some aspects, the computing device may determine a time or time window in the future to send the first portion of the requested data and/or the generated pointer. The future time window may be based on a prediction of future network conditions, such as if network congestion is expected to improve in the future. The prediction may be based on past trends. For example, if available network bandwidth has exceeded a threshold in the past during a particular time window (e.g., 3:00 PM to 4:00 PM), the computing device may elect to send the first portion of the requested data and/or the generated pointer during that future time window. Similarly, the computing device may send all requested data as links now and send the actual data during the future time window if the requesting device has not requested the data a second time prior to the future time window. The computing device may notify the requesting device of the future time window to expect the data, such as when it sends the links data to the requesting device.

Figure 4:
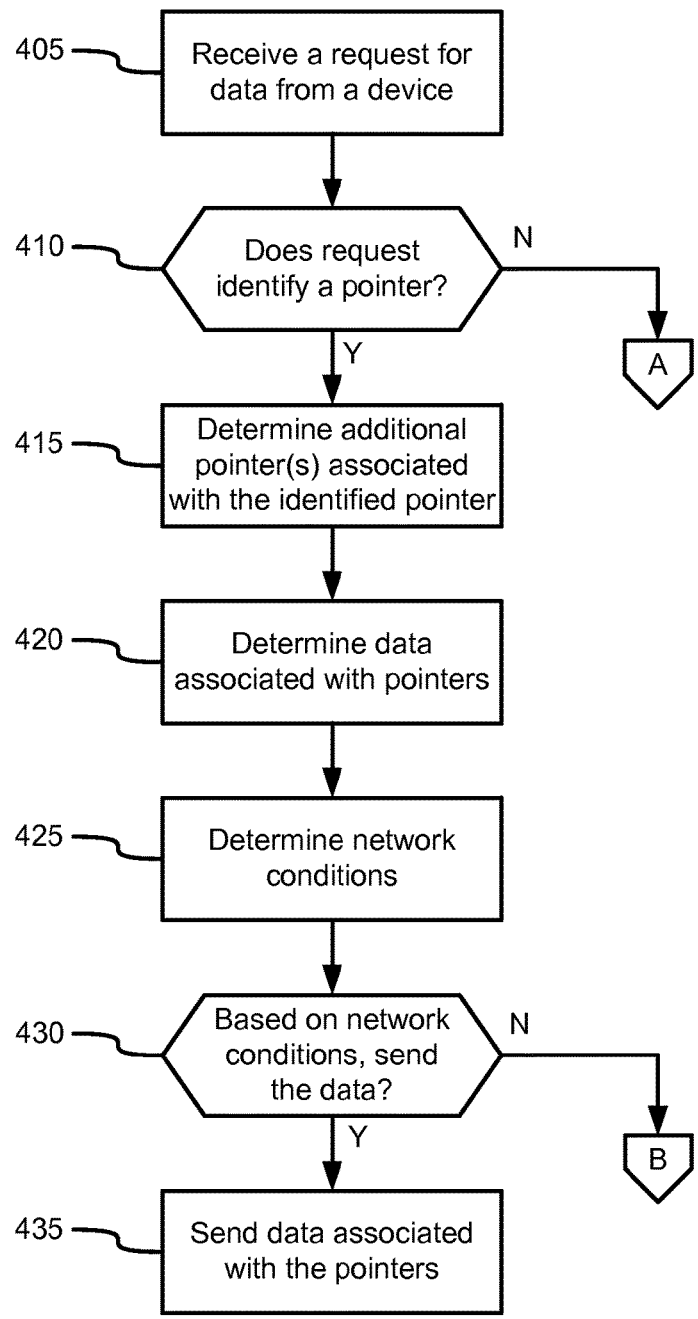
FIG. 4 illustrates another example method of responding to a request for data according to one or more illustrative aspects of the disclosure.

FIG. 4 illustrates another example method of responding to a request for data according to one or more illustrative aspects of the disclosure. In step 405, the computing device may receive a request for data (which may be a second request, third request, and so on) from the requesting device. As previously described, the requested data may include, for example, content such as movies, files, documents, videos, images, webpages, program guide data, etc. The second request may originate from the same device that made the request in step 310 or a different device. For example, the device that made the first request may have been PC 114. Another device, such as the mobile device 116, may be able to receive a response to the request. Thus, a user of the mobile device may make the second request from the mobile device by selecting one of the links.

In step 410, the computing device may determine whether the request identifies a pointer. For example, a user at the requesting device may have selected one of the links sent by the computing device in step 360. When the user selects that link, a request may be transmitted with an identifier for the link. Accordingly, the computing device may receive the request with the identifier identifying that the request originated from a particular link. If the request does not identify any links, the computing device may proceed to step 315, as illustrated in FIG. 3 and previously described.

In step 415, the computing device may determine additional pointer(s) associated with the pointer identified in the request. As described with respect to step 355, the computing device may have associated the pointer to other related pointers and/or to the requesting device. If, for example, the request in step 405 originated from the requesting device selecting the first pointer, the computing device, in step 415, may determine that the second pointer is associated with the first pointer identified in the request.

In step 420, the computing device may determine data associated with the pointers. For example, the computing device may determine first data associated with the first pointer and second data associated with the second pointer in response to determining that the second request includes the identifier that identifies the request for data and/or the first pointer. Determining the data associated with the pointers may also include, for example, identifying the location within the computing device or within the network storing the data.

In step 425, the computing device may determine the current network conditions. Step 425 may be performed in the same way as step 325 previously described. The computing device may consider, for example, computing device load, available bandwidth, latency, throughput, etc. to determine the current network conditions.

In step 430, the computing device may determine whether to send all of the data identified by all of the pointers (e.g., both the first and second pointers). Step 430 may be performed in the same way as step 330 previously discussed. For example, if the current throughput exceeds a threshold throughput, the computing device may proceed to step 435 and send all of the data identified by the pointers. By sending the data associated with the second pointer to the requesting device before the requesting device specifically requests the data associated with the second pointer, the computing device may anticipate a future request for the data associated with the second pointer even though the request might not have identified the second pointer.

On the other hand, if the computing device determines not to send all of the data identified by the pointers, the computing device may proceed to step 335 and separate the data identified by the pointers into a first portion (to be sent as inline data) and a second portion (to be sent as links data), as previously described. In some embodiments, the first portion may comprise the data associated with the first pointer, which was identified in the request of step 405. The second portion may comprise the remainder, such as the data associated with the second pointer, which was identified in step 415. If the data identified by the first pointer is too large to send, the computing device may send a portion of the data identified by the first pointer to the requesting device and send the remainder of the data identified by the first pointer (along with the data identified by the second pointer) as links data to the requesting device. In other embodiments, the computing device may send a portion of the data identified by the first pointer and a portion of the data identified by the second pointer. A third pointer (or pointers) associated with the portion of the data not sent may also be generated and/or sent to the requesting device.

Because the second pointer may already exist, the computing device might not have to regenerate the second pointer in step 345. On the other hand, the computing device may decide to separate the data identified by the second pointer into smaller portions and generate multiple pointers for the data. In other embodiments, the computing device may send the data associated with the first pointer to the requesting device, without sending the second portion as links data.

Figure 5:
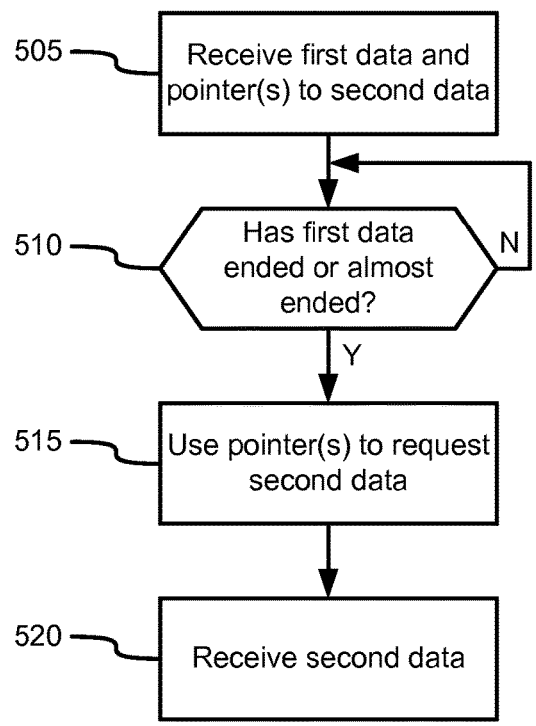
FIG. 5 illustrates an example method of receiving and using data and pointers according to one or more illustrative aspects of the disclosure.

FIG. 5 illustrates an example method of receiving and using data and pointers according to one or more illustrative aspects of the disclosure. The method may be performed by a device, such as gateway 111, television 112, STB 113, personal computer 114, laptop computer 115, wireless device 116, or any other device or client device capable of requesting data.

In step 505, the device, such as a requesting device, may receive first data and one or more pointers to second data from a computing device. As previously discussed, the first data may comprise a portion of data that the requesting device requested, such as a portion of a movie or a portion of a webpage. The requesting device may use the first data, e.g., by playing the portion of the movie or rendering the portion of the webpage received. As previously discussed, the pointers may point to second data or locations of the second data for future retrieval.

In step 510, the requesting device may determine whether the first data has ended (e.g., been used) or has almost ended. For example, if the first data is the first third of a requested movie, the requesting device may determine that the first data has ended when the first third of the movie has been completely played back at the requesting device. Additionally or alternatively, the requesting device may determine that the first data has almost ended when playback is currently at a predetermined time before the end of the first third of the movie, such as 2 minutes before the end of the first third of the movie. If the first data is a portion of a webpage, the requesting device may determine that the first data has ended when the first data has been completely rendered on a web browser running on the requesting device. Additionally or alternatively, the requesting device may determine that the first data has almost ended when a predetermined subset of the first data (e.g., 90%) has been rendered. Step 510 may be optional, and the requesting device may perform step 515 after step 505 without performing step 510.

In step 515, the requesting device may use the pointer(s) received in step 505 to request second data associated with the pointers. In some aspects, the requesting device may send another request to retrieve the second data, the request including one or more of the pointers. If the pointer is an HTTP link, such as "http://api/program_data/day3/," the requesting device may retrieve the second data by selecting the HTTP link.

In step 520, the requesting device may receive and use the second data, such as by playing back the second portion of a requested movie or by rendering a second portion of a webpage. As previously discussed, the computing device may return additional links if not all of the second data can be provided based on current network conditions. In these examples, the requesting device may repeat one or more of the steps illustrated in FIG. 5 to retrieve the additional data using the additional pointers.

The various features described above are merely non-limiting examples, and can be rearranged, combined, subdivided, omitted, and/or altered in any desired manner. For example, features of the computing device described herein (which may be one of servers 105, 106, and/or 107) can be subdivided among multiple processors and computing devices. The true scope of this patent should only be defined by the claims that follow.

I claim:

1. A method comprising:
   receiving, from a device, a request for data corresponding to a future schedule of programs, wherein the future schedule comprises:
      a plurality of textual data respectively corresponding to the programs; and
      a plurality of image data respectively corresponding to the programs;
   determining a device identifier corresponding to the device;
   determining, based on a plurality of differently-weighted network conditions and based on the request:
      a first subset, of the programs, for which the device will be sent first corresponding textual data and first corresponding image data; and
      a second subset, of the programs, for which the device will be sent second corresponding textual data, and a pointer instead of second corresponding image data;
   configuring, based on the device identifier, the pointer to point to the second corresponding image data for the second subset of the programs; and
   sending, to the device:
      the first corresponding textual data and the first corresponding image data; and
      the second corresponding textual data and the pointer.

2. The method of claim 1, wherein the pointer comprises a first pointer and a second pointer, wherein the first pointer indicates a first network location that stores a first portion of the second corresponding image data, and wherein the second pointer indicates a second network location that stores a second portion of the second corresponding image data.

3. The method of claim 1, further comprising:
   receiving a second request for the data corresponding to the future schedule; and
   after determining that the second request comprises the device identifier, sending, to the device, the second corresponding image data.

4. The method of claim 3, wherein the sending the second corresponding image data comprises sending, based on determining that the plurality of differently-weighted network conditions satisfies a threshold, the second corresponding image data.

5. The method of claim 1, further comprising:
   after determining that the plurality of differently-weighted network conditions satisfies a threshold, sending the second corresponding image data.

6. The method of claim 1, wherein the plurality of differently-weighted network conditions comprise two or more of a load of a server responding to the request, a load of the device, a load of a communication link connecting the device to the server, a throughput, an available bandwidth, a latency between the device and the server, or a network congestion.

7. The method of claim 1, wherein a duration of a first portion of the future schedule corresponding to the first subset of the programs is based on the plurality of differently-weighted network conditions.

8. The method of claim 1, wherein the determining the device identifier corresponding to the device comprises determining a media access control (MAC) address corresponding to the device.

9. The method of claim 1, wherein the determining the device identifier corresponding to the device comprises determining a device name corresponding to the device, and wherein the configuring, based on the device identifier, the pointer comprises including the device name in the pointer.

10. The method of claim 1, further comprising:
receiving, from a second device, a second request for the data corresponding to the future schedule;
determining a second device identifier corresponding to the second device;
generating, based on the second device identifier, a second pointer for the second device; and
sending, to the second device, the first corresponding textual data, the first corresponding image data, the second corresponding textual data, and the second pointer for the second device.

11. The method of claim 1, further comprising:
determining, based on a prediction of future network conditions, a future time window in which to send the first corresponding textual data, the first corresponding image data, the second corresponding textual data, and the pointer, wherein the sending is performed during the future time window.

12. The method of claim 1, further comprising:
sending, to a network location indicated by the pointer, the second corresponding image data.

13. A method comprising:
receiving, from a device via a communication network, a request for data corresponding to a future schedule;
determining a device identifier corresponding to the device;
based on a current load of the communication network, determining:
a first portion of the future schedule, wherein the first portion of the future schedule comprises a first plurality of textual data associated with a first time period, a first plurality of image data associated with the first time period, and a second plurality of textual data associated with a second time period; and
a remainder portion of the future schedule, wherein the remainder portion of the future schedule comprises a second plurality of image data associated with the second time period;
determining a first portion of the requested data corresponding to the first portion of the future schedule;
generating, based on the device identifier, a plurality of links for the device, wherein the plurality of links corresponds to the remainder portion of the future schedule; and
sending, to the device, the first portion of the requested data and the plurality of links for the device.

14. The method of claim 13, further comprising:
receiving a second request indicating a link from the plurality of links; and
after determining that the second request comprises the device identifier, sending, to the device, a second portion of the requested data corresponding to the link.

15. The method of claim 13, wherein the determining the device identifier corresponding to the device comprises determining a media access control (MAC) address corresponding to the device, and wherein the generating the plurality of links for the device is based on the MAC address.

16. The method of claim 13, wherein the determining the device identifier corresponding to the device comprises determining a device name corresponding to the device, and wherein the generating, based on the device identifier, the plurality of links for the device comprises including the device name in the plurality of links.

17. The method of claim 13, further comprising:
determining, based on a prediction of future network conditions, a future time window in which to send the first portion of the requested data and the plurality of links, wherein the sending the first portion of the requested data and the plurality of links is performed during the future time window.

18. The method of claim 13, further comprising:
sending, to a network location indicated by the plurality of links, a second portion of the requested data corresponding to the remainder portion of the future schedule.

19. The method of claim 13, further comprising:
after determining that the current load of the communication network satisfies a threshold, sending a second portion of the requested data corresponding to the remainder portion of the future schedule.

20. The method of claim 13, wherein the current load of the communication network comprises a load of a server responding to the request, a load of the device, a load of a communication link connecting the device to the server, a throughput, an available bandwidth, a latency between the device and the server, or a network congestion.

* * * * *